(12) United States Patent
Stoll et al.

(10) Patent No.: US 6,397,880 B1
(45) Date of Patent: Jun. 4, 2002

(54) MICROVALVE BATTERY

(75) Inventors: Kurt Stoll, Esslingen; Peter Post, Ostfildern; Herbert Vollmer, Notzingen; Michael Weinmann, Plüderhausen, all of (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/700,004
(22) PCT Filed: Apr. 29, 1999
(86) PCT No.: PCT/EP99/02895
§ 371 (c)(1), (2), (4) Date: Nov. 8, 2000
(87) PCT Pub. No.: WO99/58859
PCT Pub. Date: Nov. 18, 1999

(30) Foreign Application Priority Data

May 8, 1998 (DE) .......................... 198 20 519

(51) Int. Cl.⁷ .......................... F16K 31/02; F15B 13/00
(52) U.S. Cl. .................................. 137/271; 251/129.01
(58) Field of Search ............... 137/269, 884, 137/271

(56) References Cited

U.S. PATENT DOCUMENTS

| 5,971,355 A | * | 10/1999 | Biegelsen et al. | .. 251/129.01 X |
| 6,032,923 A | * | 3/2000 | Biegelsen et al. | ..... 251/129.01 |
| 6,102,068 A | * | 8/2000 | Higdon et al. | .......... 137/269 X |
| 6,116,863 A | * | 9/2000 | Ahn et al. | .................. 417/322 |

* cited by examiner

*Primary Examiner*—Kevin Lee
(74) *Attorney, Agent, or Firm*—Hoffmann & Baron, LLP

(57) ABSTRACT

A microvalve array, which possesses a plurality of microvalves (5) produced by microfabrication. It is furthermore provided with an electronic control means (7), which comprises at least one function preset unit (23) for the programmed grouped functional linking of the microvalves (5). A fluid ducts system (6) is connected with the microvalves (5), the fluid ducts (12, 12'; 13, 13'; and 14, 14') of such system being individually connected for customization, starting with a standardized arrangement in a fashion dependent on the functional valve linking, predetermined by the function preset unit (23) by opening and/or closing of passages.

17 Claims, 3 Drawing Sheets

MICROVALVE BATTERY

BACKGROUND OF THE INVENTION

The invention relates to a microvalve array.

Microvalves manufactured by microfabrication are known in the at and are for instance described in the European patent publication 0 485 739 A1. As a rule they possess a multi-layer structure and may inter alia be produced by etching and/or molding.

Owing to the constantly increasing fields of application for microvalve technology there is an increasing need for the performance of complex switching functions in a manner dependent on the control assignment.

The customizing connection together, necessary for this, of several known microvalves is not readily implemented owing to their small overall size.

SUMMARY OF THE INVENTION

Accordingly it is one object of the present invention to render possible a need-specific linking instrumentality for control technology on the basis of a multiple arrangement of micromechanical valves with simple features.

This object is to be attained by a microvalve array which comprises a plurality of microvalves collected together as a structural unit and produced by microfabrication, an electronic control means for the actuation of the microvalves and having at least one function preset unit for the programmable grouped functional linking of the microvalves, and a fluid duct system connected with the microvalves, fluid ducts of the said system being individually connected for customization, starting with a standardized predetermined arrangement, in a manner dependent on the functional valve linking, preset with the function preset unit, by opening and/or closing passages.

It is in this manner that a multiple arrangement of microvalves collected together as a structural unit is provided, which on the basis of a base structure with mutual adaptation may be linked both controlwise and also fluidwise more or less at will to produce one or more functional groups. By suitably programming the function preset unit it is possible for the individual valves to be collected together as functional groups, which when operated lead to a manner of operation corresponding to a particular functional pattern so that using the functional groups, higher order valve functions can be emulated or furthermore parallel circuits may be produced for the purpose of increasing the rate of flow. Thus it is possible, with the aid of function preset unit, to set the functionality of the valves so that the microvalves collected together within a functional group cooperate during operation and perform like a valve with the predetermined functionality. In order to ensure a functional variability of the microvalve array in addition the programming possibilities provided on the control side, additional possibilities are provided for as regards flexible customizing switching of the fluid ducts communicating with the microvalves. The same comprise a fluid duct system connected with the microvalves, that is to say there is a multiple arrangement of fluid ducts, wherein starting with a standard predetermined duct arrangement and taking into account the functionality, preset by electrical programming, of the microvalves collected together in groups, an individual customizing switching of the fluid ducts becomes possible by opening and/or closing passages between fluid ducts. Such a programmable multiple arrangement of microvalves renders possible batch manufacturing methods in microtechnology with a saving in costs, since identical microvalve systems may be produced, whose valve functionality is initially set, before use, by programming, that is to say mutual matching of functional control linking and customizing fluid duct switching.

Although for example the German patent publication 4,221,089 A1, the German patent publication 4,003,619 A1, the U.S. Pat. No. 5,322,258, the U.S. Pat. No. 5,417,235, the U.S. Pat. No. 5,640,995 or the German patent publication 3,621,331 A1 disclose multiple arrangements of microvalves, which are in part also able to be electrically operate in a variable manner, there is however no account of variable fluid switching on the basis of the intended control presets.

Further advantageous developments of the invention are defined in the dependent claims.

From the point of view of manufacturing technology a configuration is particularly advantageous in which the microvalves collected together in the microvalve array are all of the same type, as for example of the 2/2 or 3/2 type of switching valve. However it would certainly be feasible to have microvalves of different types in one and same microvalve array.

From the point of view of control technology it is possible for the microvalve array to be so designed that it is self-contained in operation and for it to have a preferably freely programmable internal control program in the control means to produce control signals on the basis of which in connection with the associated functional linking parameters stored in the function preset unit the necessary actuating signals are generated, which are applied in a correspondingly set fashion to the microvalves collected together as a functional group in order to produce the desired manner of operation. As an alternative or in addition the control signals could also be applied via a bus connected with the control means and via such bus feedback to a master control device may take place in case of need.

Programming of the function preset unit(s) can advantageously also take place via a bus communicating with the microvalve arrays control means. Furthermore remote controlled programming without wired connections would be possible.

Preferably the microvalve array comprises a laminated body made up of a plurality of superposed layer elements permanently joined together with an interior space having the microvalves and also the fluid duct system formed therein, the production thereof being preferably by micromechanical processing prior to the fitting together of the individual layer elements.

The opening and/or closing of passages takes place for switching of the fluid ducts by opening and/or sealing passages may f. i. be implemented by the use of a suitable separate switching means. In this respect the reader may imagine having a sort of pin cushion bearing pins arranged in accordance with the desired switching state and which may be depressed into a base containing the fluid duct system and to open passages therein. In accordance with further advantageous development of the invention the fluid duct system is provided at predetermined points with sealing means, whose operation will cause opening or closing of a passage between fluid ducts. Such sealing means could for example take the form of plain plug-like partitions within the fluid duct system, which as needed are removed thermally. Furthermore here micromechanical switching valves could be employed as sealing means, which dependent on the position of switching, would open or close a passage and which for example could be mechanically locked in the respective position of switching. More particularly it would also be possible to have valves, whose principle of function is a piezoelectric, magnetostrictive or memory metal one.

It is furthermore an advantage for the customizing fluid switching of the fluid ducts to be reversible so that one application the same valve array may be readily modified on altering the conditions of use as regards the programming of its functionality. In this case remote control actuation, more particularly using non-wired transmission means, would be possible.

In the following the invention will be described with reference to the accompanying drawings in detail.

DETAILED DESCRIPTION OF THE PREFERRED EMBODIMENTS

Figure 1:
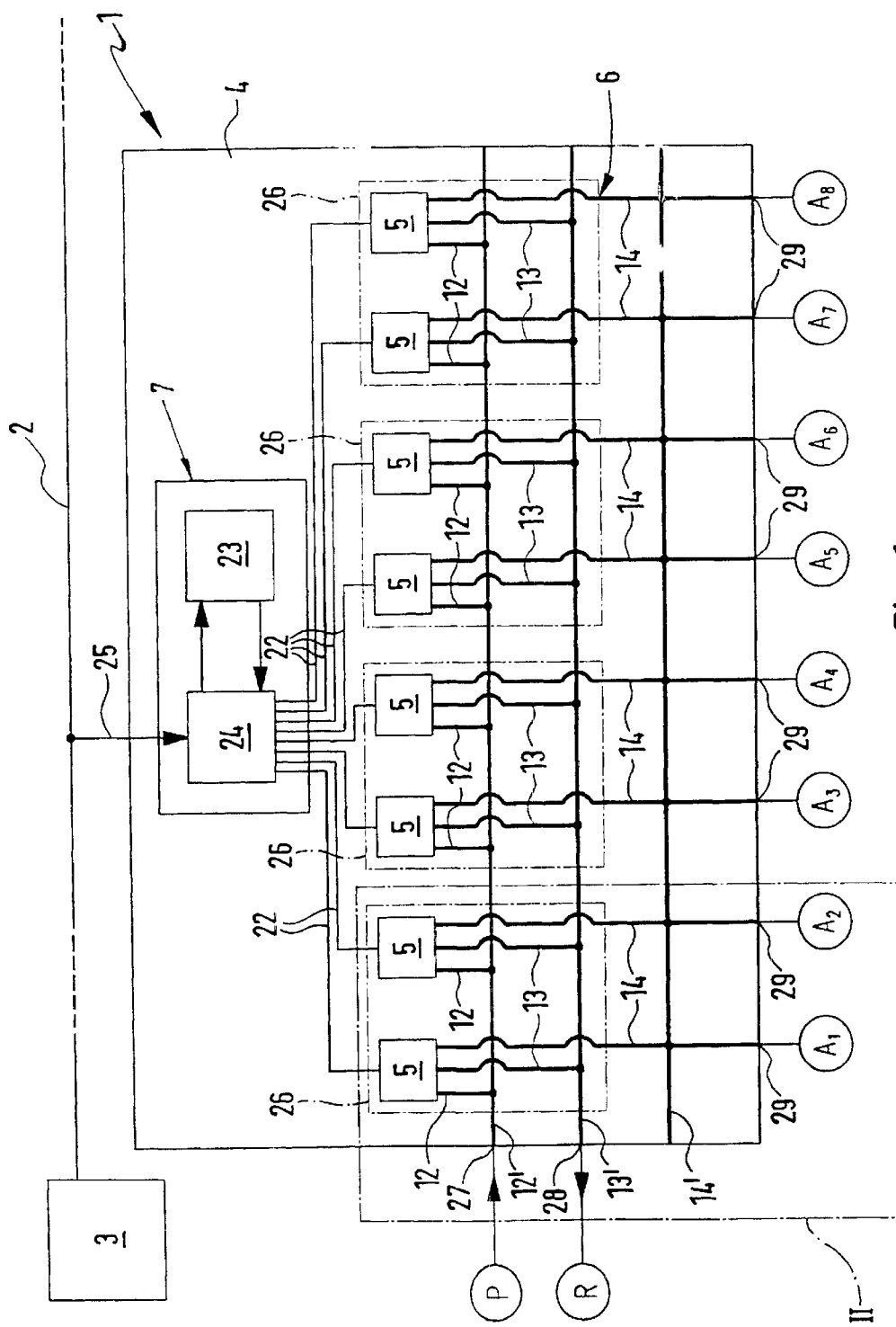
FIG. 1 shows a first design of the microvalve array in a plan view diagrammatically, the ducts of the duct system being indicated in thick lines in a standardized arrangement without customized duct connections.

The figures in the drawings are not true to scale, this also applying for the proportions between the individual components.

FIG. 1 shows a microvalve array 1, connected via a bus 2, which in the illustrated working embodiment, is designed for serial transmission, for communication with an external control device 3. It is possible for further microvalve arrays 1 to be connected with the bus 2.

The microvalve array 1 comprises a base 4, which in the working example is block-like. This base is provided with a plurality of microvalves 5 and a fluid duct system generally referenced 6, and furthermore with an electronic control means 7.

The electronic control means 7 serves for actuation, that is to say operation, of the individual microvalves 5, which for their are able, in manner dependent on the selected actuation, to control fluid flows, which may exist in the fluid duct system 6. A preferred application of the microvalve array 1 is in the pneumatic sector, the controlled fluid being in the form of compressed air.

By way of the base 4 the microvalves 5 are connected together as an assembly. They are, as is also the case preferably with the fluid duct system 6, produced by a suitable microfabrication method. Here etching technology using silicon material or molding using plastic material is suitable. Since suitable methods of production are known per se, a more detailed account thereof is unnecessary here.

Figure 4:
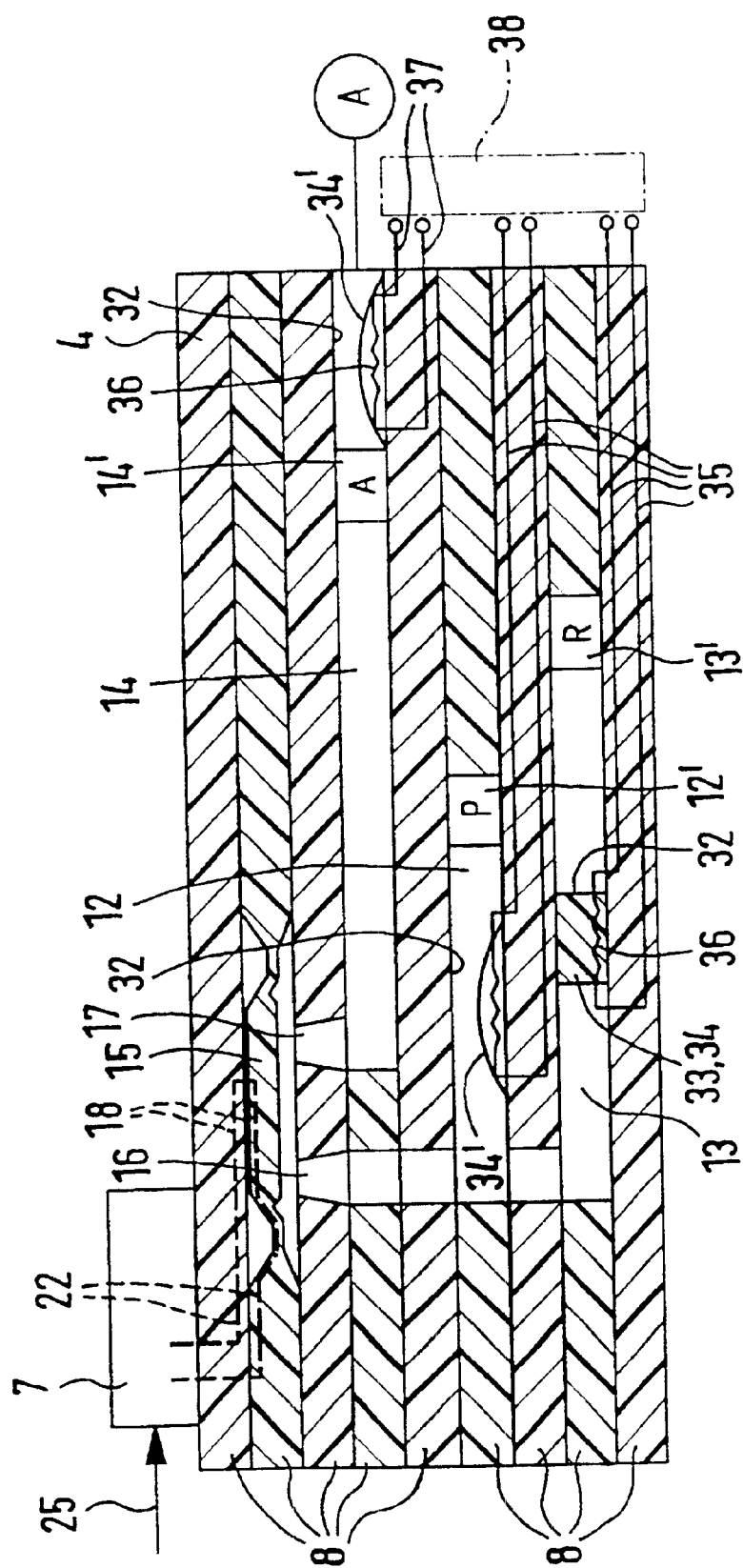
FIG. 4 shows a cross section of the microvalve array taken on the section line IV—IV of FIG. 2, the relevant fluid ducts being illustrated in a common section plane in such a manner as to simplify the drawing.

In the illustrated working embodiment the base 4 is designed in the form of a laminated body, something which is made clear by FIG. 4. It comprises a plurality of layer elements 8 stacked flatwise on one another, and joined together, for example by bonding, permanently. In the illustrated working embodiment same comprise silicon material or an equivalent semiconductor material. The microvalves 5 and the fluid duct system 6 are provided in the interior of the base 4. They are produced by a suitable microfabrication of the layer elements 8 before same are put together. Individual fluid ducts of the fluid duct system 6 are indicated by reference numerals 12, 13 and 14.

In order to make the drawing more straightforward in the sectional view of FIG. 4 the microvalve 5 indicated therein and the fluid ducts 12, 13 and 14 communicating with it are represented in different layer planes. This means that there is a correspondingly large of layer elements 8. In an actual design the number of layer elements 8 may be substantially reduced if the fluid ducts 12, 13 and 14, which are mutually from each other, are partly arranged in the same layer planes.

All in all the fluid duct system 6 in the embodiment comprises three types of duct, that is to say feed ducts 12, venting ducts 13 and power ducts 14. These fluid ducts are provided in a standardized arrangement, as they are indicated in FIG. 1 by way of example. This standardized arrangement represents a certain distribution and also a fluidwise liking of the individual fluid ducts 12, 13 and 14.

The microvalves 5 contained in the microvalve array 1 are preferably of the same type throughout. In the illustrated working embodiment it is a question of 2/2 switching valves, which respectively comprise a valve member 15, which may be switched between an open position indicated in FIG. 4 and a closed position, not illustrated. In the open position it renders possible a fluid connection between the two openings 16 and 17, whereas in the closed position it interrupts such fluid connection.

The chief mechanical features of the microvalves 5 can be seen from the valves described in the said European patent publication 0 485 739 A1, which may be referred to for further details. Microvalves 5 of the working example are of the normally closed type and can be switched over by the application of an electrical voltage to the opposite electrodes 18 into the open position by electrostatic forces. The actuating signals necessary for this are passed via suitable electrical conductors 22 coming from the electronic control means 7 also arranged on the base 4.

Instead of the microvalves of the 2/2 type it would in principle be possible to employ other valve types, as for example 3/2 switching valves. Moreover it would be possible to fit one and the same microvalve array simultaneously with different types of microvalves. However it has turned out that on the basis of fitting 2/2 valves throughout the best possible functionality is produced coupled with optimum manufacturing technology.

The electronic control means 7 associated with the microvalve array 1 and preferably produced with it as a single assembly, possesses a function preset unit 23 and a signal transmission unit 24. These two units are in the embodiment of the invention produced separately, although they might also have an integrated structure. The signal transmission unit 24 communicates via the bus 2 with the external control means 3 and receives from it, as indicated by the arrow 25, the control signals required for operation of the microvalves 5. In case of need it is possible for feedback signals to pass by way of bus 2, such signals confirming the performance of actuation.

Furthermore the signal transmission unit 24 communicates via the electrical conductors 22 with each individual one of the microvalves 5. Via such electrical conductors 22 the microvalves 5 are supplied individually with the electrical confirmation signals intended for them. In the illustrated working embodiment during the duration of an input confirmation signal the valve member 15, otherwise assuming the closed position of the respective microvalve 5, is held in the open position.

The signal transmission unit 24 furthermore is connected for data exchange with the function preset unit 23. In the latter the function linking parameters are stored, which serve for grouped functional linking of the microvalves 5. It is therefore possible to group together any desired number of microvalves at will as functional groups, the valves within one respective functional group possessing an operational characteristic matching the other valves in the group, such characteristic being determined by the function linking parameters.

The microvalve array of the embodiment of the invention possesses eight microvalves in all, which are put together as functional groups in pairs so that in all there are four functional groups 26, which are indicated in FIG. 1 in chained lines as frames.

It is not necessary for the microvalves 5 put together as functional groups to be directly adjacent. Any desired arrangement and association of the number of microvalves 5 present is possible. Furthermore, individual microvalves 5 may simultaneously belong to several different functional groups.

During operation of the microvalve array 1 the control signals arriving as indicated by the arrow 25 are now linked with the stored function linking parameters so that actuating signals specific for certain functional group are produced, which are then transmitted to the respective microvalves 5, which are then actuated with the desired functionality.

If the control signals 25 are supplied as serial signals the signal transmission unit 24 will comprise a suitable bus node, which is in a position of reading the control signals in relation to the microvalve array.

It will be clear that the signal transmission unit 24 may also be equipped with an internal control program, which in a self-sufficient manner or in a manner matching the external control device produces the desired control signals.

It is convenient for the function preset unit 23 to be reversibly programmable so that customized flexible programming or, respectively, presetting of the function linking parameters becomes possible. Such programming may for example be performed using a programming unit able to be detachably connected with the control means 7 and for example in the form of a PC, although programming any wired connection or programming via the bus 2 and for instance switching the external control device into the setup would also be possible.

In the illustrated working embodiment a single function preset unit 23 is provided in common for all microvalves 5, which furthermore can be arranged within the base 4 in different layers as well and with mutual overlap. In this respect it would be conceivable as an alternative as well in some circumstances to be provide a plurality of function preset units independently of the number of the microvalves 5 provided in the microvalve array, which unit would be responsible for the operation of different function groups 26.

It will be clear as well that it is not absolutely necessary for all microvalves 5 of the microvalve array 1 to be linked together as one or more function groups 26. In fact, individual valves could be operated separately and individually as well with the function characteristic allotted to them.

The fluid ducts 12, 13 and 14 of the fluid duct system 6 are so customizingly connected together taking into account the predetermined functional linking of the microvalves 5 that the valve function required for each function group 26 as regards the fluid control is in fact actually obtained. There is thus a matching of the electronic actuating side to suit the fluid customized connection side taking into account the desired functionality.

In order to implement such matching in a customized fashion and extremely flexibly, as a starting point a fluid duct system 6 is provided in the above mentioned standardized predetermined arrangement. In the working embodiment the fluid duct system 6 comprises a plurality of feed ducts 12, which are respectively connected with one of the microvalves 5 and on the other hand may be connected in common with a principal feed duct 12', which extends through the base 4. Via a connection opening 27 on the outer face of the base 4 the principal feed duct 12' is connected with a suitable pressure source P.

Moreover each microvalve 5 is connected with a venting duct 13, all venting ducts 13 opening in common into a principal venting duct 13' extending through the base 4 in parallelism to the principal feed duct 12' and having an opening 28 on the outer face of the base 4, where there is a connection with a pressure sink R, as for example the atmosphere.

Finally there is a number of power ducts 14 corresponding to the number of microvalves 5 and connected respectively with one of the microvalves 5 at one end and at the other with a respective separate connection opening 29 at the outer face of the base 4, where possibilities of connection are provided in order to join up with a load $A_1, A_2 \ldots A_8$. A connecting duct 14' furthermore provides for fluid connection of all power ducts 14. In the working embodiment it runs in parallelism to the principal feed duct 12' and to the principal venting duct 13'.

Figure 3:
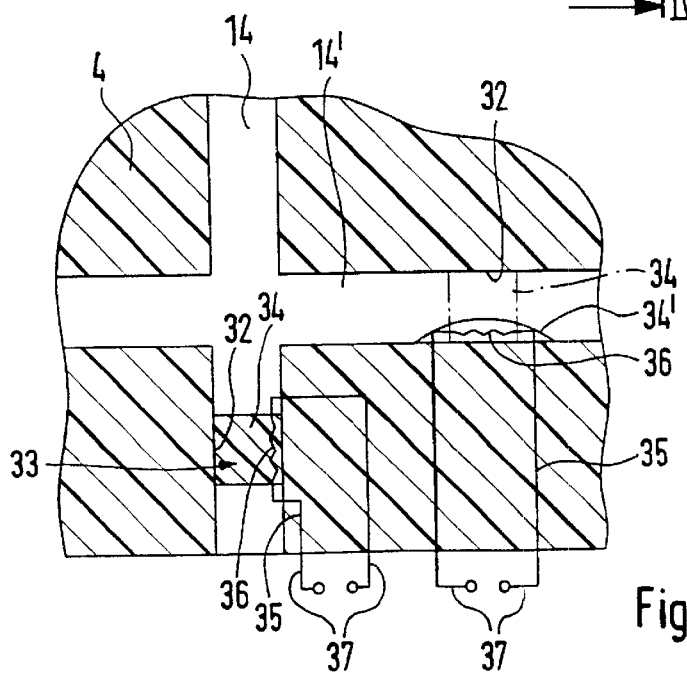
FIG. 3 is a sectional view of the part III, marked in chain lines in FIG. 2, on a larger scale.

In order to adapt the fluid duct system 6 to the desired functionality of the function groups 26, its fluid ducts 12, 13 and 14—that is to say in including the principal feed duct 12, the principal venting duct 13' and the connection duct 14'—are individually connected for customization by opening and/or closing passages 32 (see FIGS. 3 and 4).

Figure 2:
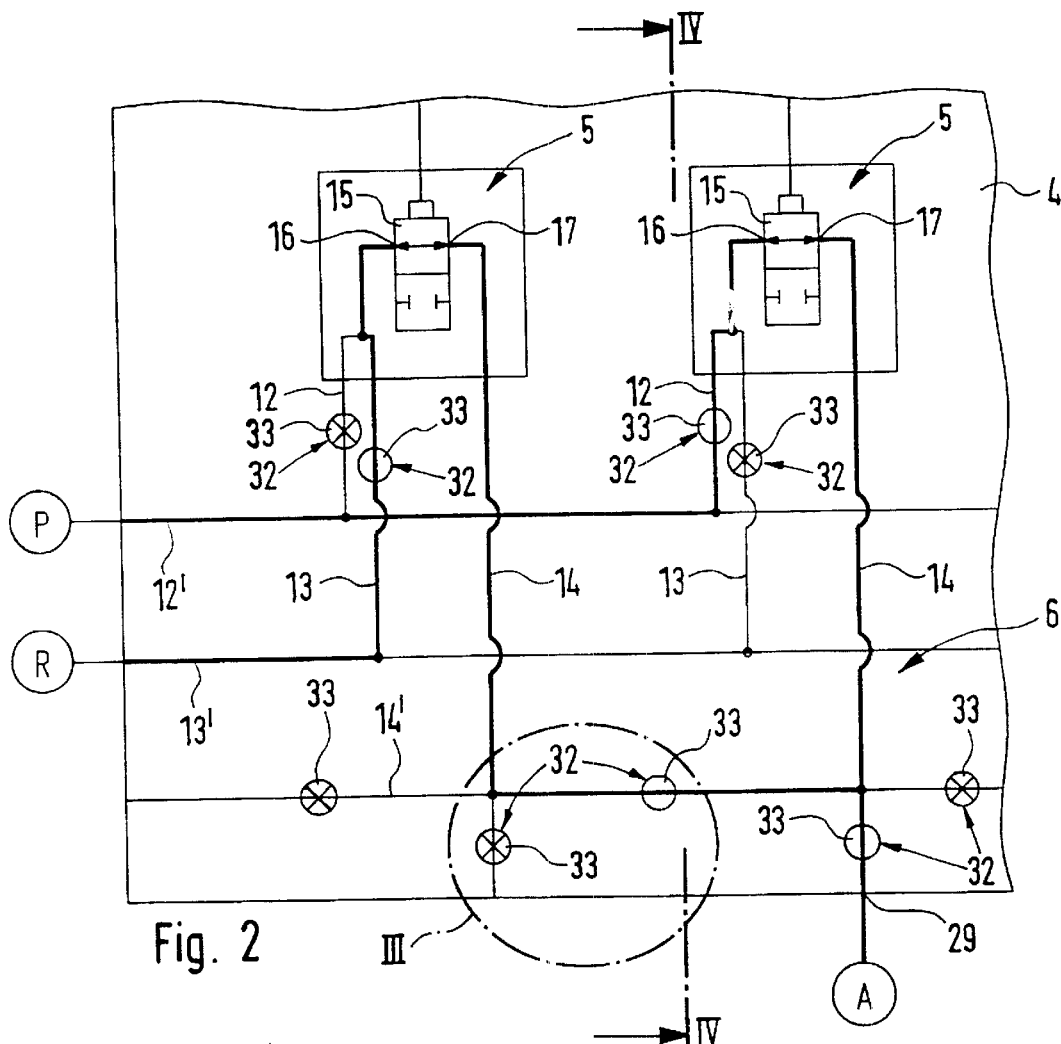
FIG. 2 shows the part II of FIG. 1 included in a chain lined frame of the microvalve array on a larger scale, one possibility of customized fluid connection of the fluid duct system being illustrated while thicker lines are employed to indicate the flow paths opened by customized connections.

The customizing connection is implemented in the working example using suitable sealing means 33, which are placed at the positions of the fluid duct system, at which the passages 32 are located. As shown in FIG. 2 the sealing means 33 are indicated by circles drawn in the course of the ducts.

Now it is for example possible to make a provision such that in the standardized arrangement of the fluid duct system 5 the sealing means 33 all open controllable passages 32. In the preferred working embodiment illustrated in FIGS. 3 and 4 there is however a provision that the fluid passages 32 are closed in the standardized arrangement, partitions 34 being provided as the sealing means 33 in the respective fluid duct 32, 33 and 34 at the position of any eventual passage 32 to be opened. The partitions 34 it may be a question of single-piece components of the base 4 or, respectively, of the layer elements 8. In the standardized design therefore the fluid ducts 12, 13 and 14 of the fluid duct system 6 are separated from one another at suitable, predetermined. points and a passage 32 is only opened if this is necessary to match the predetermined electrical linking of the valves.

As shown in FIG. 2 the sealing means 33 for closing a passage are indicated by a cross. The remaining sealing means 33 leave an opening free. It is in this manner that a customized duct connection state is provided, which in the case of function group 26 depicted in FIG. 2 and composed of two 2/2 microvalves all in all leads to a 3/2 switching function. Therefore starting with two microvalves 5 with a lower order switching function it is possible to emulate a higher order switching function, it being possible to emulate even more complex valve functions by the inclusion of further microvalves 5 in the function group 26, as for instance a 4/2 or a 5/3 switching function.

On the same lines it would be feasible as well to undertake linking of the fluid ducts 12, 13 and 14 in such a fashion that there would be a parallel connection of two or more microvalves 5 for the purpose of increasing the flow cross section or aperture available.

Accordingly there is generally speaking the possibility, for customization starting with the manufacture of identical arrayed microvalve systems, to program the electronic control side and also the fluid connection side to provide an individual or customized valve functionality, in the case of which starting with a similar structure and accordingly having recourse to standardized methods of manufacture the most various different cases of application can be taken into account.

By way of example in FIGS. 3 and 4 show a possible design of sealing means 33. They are so contrived that normally in the non-actuated state they cause the closure of a passage 32 between two fluid ducts. By actuation or activation the respectively associated passage 32 is opened. They are formed by partitions 34 which are provided with actuating means 35, on whose activation same can be removed thermally by the supply of energy.

The actuating means 35 associated with each respective partition 34 in the working embodiment comprise a more particularly wire-like heating element 36 extending in the partition 34, such element 36 being able to be connected via conductors 37 arranged on the outside of the base 4 with an electrical power supply so that by the action of heat fusion and/or evaporation of the partition 34 may be brought about. As shown in FIGS. 3 and 4 fused partitions are indicated at 34', which open up a fluid passage.

Whereas in the case of the sealing means 33 in the embodiment as part of programming or customizing connection the fluid connections necessary for the respective function are opened, it is possible in an alternative design also to start with opened passages and fluid connections not required for a particular application are sealed off on programming the arrangement.

This could for instance be implemented by placing a plug-like obstacle at the respective point or again by using heat to cause fusion so that with a sort of welding action the respective passage is closed. It would be feasible as well for the sealing means 33 to be designed in the form of micromechanical switching valves, for instance of the same type as described with reference to the microvalves 5. It is in this case possible for that reversible customized connections to be produced in a relatively simple manner as well, which following opening of a passage taking place as part of programming renewed closure is rendered possible or vice versa.

If sealing means in the form of valve are employed, it would be possible more particularly for designs to be utilized, which are based on a piezoelectric and/or magnetostrictive principle of function. Furthermore valves, for whose actuation the properties of a so-called memory metal are taken advantage of, could find application. This list of possible mechanisms is naturally not exclusive.

It is furthermore an advantage for an external customizing connecting means 38 to be provided for programing the fluid connections, as is indicated diagrammatically in chained lines in FIG. 4 by way of example. The customizing connection means 38 employed here is a programming device. It may for instance be connected with the conductor 37 leading to the heating elements 36 and preferably renders possible a simultaneous production of all desired fluid duct connections needed for customization, for example by way of the application of suitable voltages or by the application of other signals. Using flexible programming of the customizing connecting means 38 it is then possible to meet any specific case without any problems.

In the case of design, which is not illustrated, of the customizing connection means 38 a sort of pin cushion is provided, which may be thrust in the base 4 and whose pins may be heated so that at the positions of the inwardly thrust pins a fusion operation may be caused for closing and/or opening of duct passages. Here as well a flexibly programmable design is possible, for instance in such a manner that the individual pins are arranged on a pin carrier and may be positioned in relation to same in an inserted and a projecting position, only those pins being shifted into the projecting position which are to be inserted into the base.

It would also be conceivable to work with expendable pins in such a manner that, preferably with the supply of heat, the pins could be thrust into the base 4 to remain there as sealing means at the passages 32 to be sealed.

It will be clear that furthermore other suitable means can be employed for customizing fluid connection. It would furthermore be possible for remote controlled and more especially non-wired actuation of the sealing means to take place.

It is furthermore to be pointed out again that the number of microvalves 5 provided per microvalve array may, in principle, be varied at will and that it is certainly possible for the number to be of the order of 100. By suitable batch production methods, as are customary in microfabrication, it is possible for the necessary structural details to be produced in an economic manner.

In the case of a further design, not illustrated in the drawings, in addition to the above mentioned components, the microvalve array contains a plurality of sensors. These sensors are arranged with a standardized distribution and for customization by opening and/or sealing passages individually may be connected with the fluid ducts 12 and 12'; 13 and 13'; and 14 and 14'. Opening and/or sealing of the passages may be undertaken in a fashion as is also employed within fluid duct system as regards the fluid ducts. Thus it is possible to connect one or more sensors as required with one or more fluid ducts to achieve the properties associated with the respective fluid duct. The sensors may for example be used for measuring the pressure or the rate of flow.

The sensors are furthermore, like the individual microvalves, electrically coupled with the function preset unit 7 and are in a position of transmitting sensor signals to this function preset unit. It is in this manner that it is possible for the operation of the microvalves to take place in a manner dependent on the circumstances detected in one or more of the fluid ducts.

It is possible in this manner to perform regulation and display functions without additional external component being necessary and in a very simple manner. The integrated sensor means furthermore mean that comprehensive connection operations are unnecessary and a compact structure may be produced. This means that it is possible to integrate the sensors in any layer elements 8 present. In case of need it is possible for all sensors to be accommodated in a common layer element.

What is claimed is:

1. A microvalve array comprising:

a plurality of microvalves (5) collected together as a structural unit, an electronic control means (7) for the actuation of the microvalves (5) and having at least one function preset unit (23) for programmable grouped functional linking of the microvalves (5), in the electronic control means (7) valve specific actuating signals being produced for the addressed microvalves (5) from control signals, which are supplied or are produced in an internal control program and from associated function linking parameters stored in the functional preset unit (23), and a fluid duct system (6) connected with the microvalves, and fluid ducts (12, 12'; 13, 13'; and 14, 14') of the system being individually connected for customization, starting with a standardized predetermined arrangement, in a manner dependent on the functional valve linking, preset with the function preset unit (23), by opening and/or closing a plurality of passages (32) individually.

2. The microvalve array as set forth in claim 1, characterized in that a single function preset unit (23) is associated with all microvalves (5) in common.

3. The microvalve array as set forth in claim 1, characterized in that the microvalves (5) are all of the same switch functional type.

4. The microvalve array as set forth in claim 1, characterized in that one or more microvalves are of the 2/2 switching valve.

5. The microvalve array as set forth in claim 1, characterized in that at least one function preset unit (23) permits a linking of microvalves (5) to perform a function which is of a higher order than a 2/2 switching function.

6. The microvalve array as set forth in claim 1, characterized in that at least one function preset unit (23) permits a linking of microvalves (5) as a parallel circuit for the purpose of increasing the flow cross sections available.

7. The microvalve array as set forth in claim 1, characterized in that the electronic control means (7) is so designed that it provides connection of a bus (2) communicating with a separate control device (3).

8. The microvalve array as set forth in claim 7, characterized in that control means (7) contains a bus node (24), which is designed for the reception of serial control signals.

9. The microvalve array as set forth in claim 1, characterized in that at least one function preset unit (23) is reverse programmable.

10. The microvalve array as set forth in claim 1, characterized in that the electrical control means (7) permits programming of the at least one function preset unit (23) is able to be performed from an external agent via a connected bus (2) or without any wired connection.

11. The microvalve array as set forth in claim 1, characterized by a laminated body comprising a plurality of superposed layer element (8), which body contains the microvalves (5).

12. The microvalve array as set forth in claim 1, characterized in that the fluid duct system (6) possesses sealing means (33) at predetermined points, whose actuation at the respective point causes opening or closing of a passage (32) between fluid ducts.

13. The microvalve array as set forth in claim 12, characterized in that the sealing means (33) are at least partially constituted by partitions (34) able to be thermally removed by, for example, fusion or evaporation.

14. The microvalve array as set forth in claim 12, characterized in that the sealing means (33) are at least partly constituted by microvalves.

15. The microvalve array as set forth in claim 12, characterized in that the sealing means (33) are at least partly constituted by valves, which are based on a magnetostrictive and/or piezoelectric effect and/or on a memory metal effect.

16. The microvalve array as set forth in claim 12, characterized in that the sealing means are able to be actuated under remote control.

17. The microvalve array as set forth in claim 1, characterized in that a plurality of sensors is present in a standardized distribution, which on the one hand are connected with the function reset unit (23) and on the other hand are able to be connected for customization by opening and/or closing passages individually with the fluid ducts (12, 12'; 13, 13'; and 14, 14') and whose sensor signals are processed in the function reset unit (23).

* * * * *